US009530260B1

(12) United States Patent
Sitarski

(10) Patent No.: US 9,530,260 B1
(45) Date of Patent: Dec. 27, 2016

(54) SMART KEY REGISTRATION NOTIFICATION SYSTEM

(71) Applicant: Toyota Motor Engineering & Manufacturing North America, Inc., Erlanger, KY (US)

(72) Inventor: Nicholas Scott Sitarski, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/742,046

(22) Filed: Jun. 17, 2015

(51) Int. Cl.
G05D 19/00 (2006.01)
G07C 9/00 (2006.01)

(52) U.S. Cl.
CPC .................. *G07C 9/00103* (2013.01)

(58) Field of Classification Search
None
See application file for complete search history.

(56) References Cited

U.S. PATENT DOCUMENTS

| 3,703,714 A | 11/1972 | Andrews |
| 6,430,488 B1 | 8/2002 | Goldman et al. |
| 7,768,377 B2 | 8/2010 | Brey |
| 8,232,864 B2 | 7/2012 | Kakiwaki |
| 8,606,589 B2 | 12/2013 | McGinn et al. |
| 2012/0146404 A1* | 6/2012 | Fuchida ................. B60R 16/02 307/9.1 |
| 2013/0285792 A1* | 10/2013 | Shimizu ................ H04L 9/3226 340/5.6 |
| 2013/0297100 A1 | 11/2013 | Petersen et al. |
| 2015/0222604 A1* | 8/2015 | Ylonen ................. H04L 63/062 713/171 |

FOREIGN PATENT DOCUMENTS

| CN | 203547283 U | 4/2014 |
| EP | 0804354 A1 | 11/1997 |
| EP | 1800975 A1 | 6/2007 |
| EP | 2767446 A1 | 8/2014 |

* cited by examiner

*Primary Examiner* — Adolf Dsouza
(74) *Attorney, Agent, or Firm* — Dinsmore & Shohl LLP

(57) ABSTRACT

A notification system and method for registration of a new key. The system includes an electronic control unit (ECU) adapted to receive and store information regarding the registration of a new key, a processor in communication with the ECU, the processor adapted to determine if a notification should be provided to the user regarding the registration of a new key, the ECU adapted to control where the notification is displayed and a display screen in communication with the ECU, the display screen adapted to display a notification to the user that the new key has been registered.

19 Claims, 4 Drawing Sheets

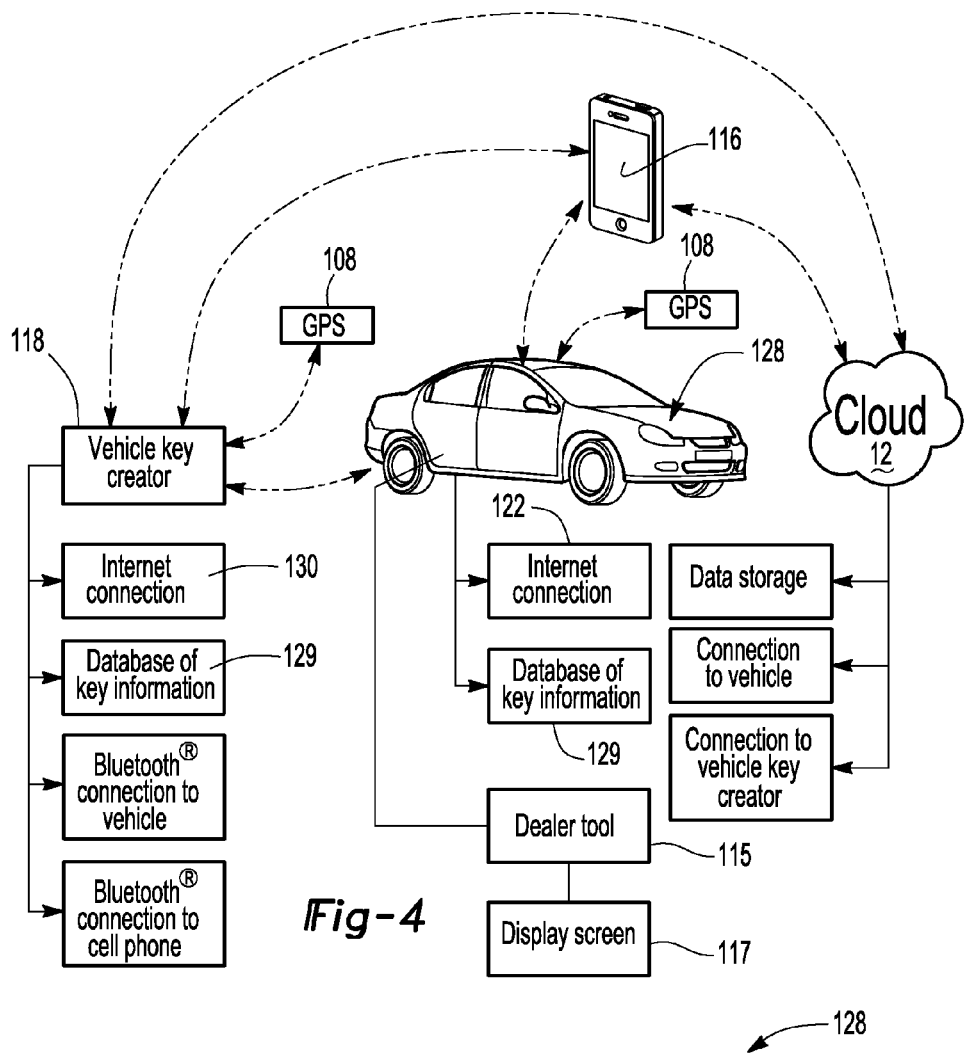

SMART KEY REGISTRATION NOTIFICATION SYSTEM

FIELD OF THE INVENTION

The system relates generally to notifying a user when a new smart key has been created. More particularly, the present system relates to a notification system of displaying or otherwise alerting a user of when and where a vehicle key has been created so as to prevent unauthorized key creation.

BACKGROUND OF THE INVENTION

Smart keys are now commonly used in vehicles and adapted to store information about user seat positioning, radio assignments, and other user preferences. A smart key cannot be replicated unless an existing smart key already exists. To create a duplicate smart key, a key creator and an existing smart key must be present. Unfortunately, it is an increasing problem where thieves create a duplicate key to a vehicle in order to steal the vehicle at a later time. Typically, these thefts occur in a valet situation where the thief has access to both an existing vehicle key and the vehicle. A vehicle key creator is used to make a duplicate and unauthorized vehicle key. In this situation, the user of the vehicle is not aware that an unauthorized key has been created. Accordingly, there exists a need in the art to provide a notification system to the user that an unauthorized vehicle key has been created. Specifically, there exists a need in the art to provide a notification system that provided details of exactly when and where the unauthorized key was created.

SUMMARY OF THE INVENTION

A notification system for registration of a new key is provided. The system includes an ECU (or module) adapted to receive and store information regarding the registration of a new key, a processor is contained within (as a micro) and in communication with the ECU, the processor adapted to determine if a notification should be provided to the user regarding the registration of a new key, the ECU is also adapted to control where the notification is displayed and a display screen in communication with the ECU, the display screen adapted to display a notification to the user that the new key has been registered.

A GPS unit is contained within the vehicle, the GPS in communication with the processor to determine the location of the vehicle when the new key was registered. The location of the vehicle when the key was registered is displayed on the display screen. The location of the vehicle when the new key was created may also be communicated to a third party.

A clock is contained within the vehicle, the clock in communication with the processor to determine what time the new key was created. Essentially, a time stamp is provided as soon as the new key is created. In one embodiment, the time that the new key was created is displayed on the display screen within the vehicle. In other embodiments, the time that the new key was created is communicated to a third party.

In an alternative embodiment, a notification system for registration of a new key including an ECU adapted to receive and store information regarding the registration of a new key, a processor contained within (as a micro) and in communication with the ECU, the processor adapted to determine if a notification should be provided to the user regarding the registration of a new key, the ECU adapted to control where the notification is displayed and the ECU adapted to automatically send an electronic communication to the user of the vehicle through email and/or text messaging, the electronic communication including a notification to the user that the new key has been registered. A GPS unit may be contained within the vehicle, the GPS in communication with the processor to determine the location of the vehicle when the new key was registered. In one embodiment, the location of the vehicle when the key was registered is sent to the user via the electronic communication. In other embodiments, the location of the vehicle when the new key was created is communicated to a third party. A clock may be contained within the vehicle, the clock in communication with the processor to determine what time the new key was created. The time that the new key was created may be sent to the user via the electronic communication. The time that the new key was created may also be communicated to a third party.

A method relating to the present system of providing a notification to the user of a vehicle is also provided. The method includes the steps of creating a new vehicle key in connection with an existing vehicle, creating of the new vehicle key by means of a key creator, storing the time, date and/or location of when and/or where the vehicle key was created and displaying the time, date and/or location of when and/or where the vehicle key was created on a display screen within the vehicle. The method may further comprise the step of determining by a processor if the time, date and/or location of when and/or where the vehicle key was created should be displayed. The method may further comprise the step of transmitting the time, date and/or location of when and/or where the vehicle key was created to a third party.

The method may further comprise the step of electronically notifying the user via email and/or text message of the time, date and/or location of when and/or where the vehicle key was created. The method may further include the step of displaying the time, date and/or location of when and/or where the vehicle key was created on a display screen within the vehicle automatically upon starting of the vehicle. Alternatively or in addition to, an audible alert may be provided to the user when the new vehicle key has been created.

BRIEF DESCRIPTION OF THE DRAWINGS

FIG. 4 illustrates the system of the present notification system;

FIG. 5 illustrates an example database of key information;

DETAILED DESCRIPTION OF THE DRAWINGS

The present system and method provides for a notification system and method for registration of a new and/or unauthorized key. The system includes an Electronic Control Unit (ECU) (or module) adapted to receive and store information regarding the registration of a new key, a processor in contained within (as a micro) and in communication with the ECU, and the electronic control unit in communication with the processor adapted to control when and where the notification is communicated to the user. The notification system and method provides notice to the user of a vehicle if a new and/or unauthorized key is created. If the new key created is also unauthorized, the user may then take the vehicle to a dealership to remove the new registration thereby preventing the possibility of theft of the vehicle.

Figure 1:
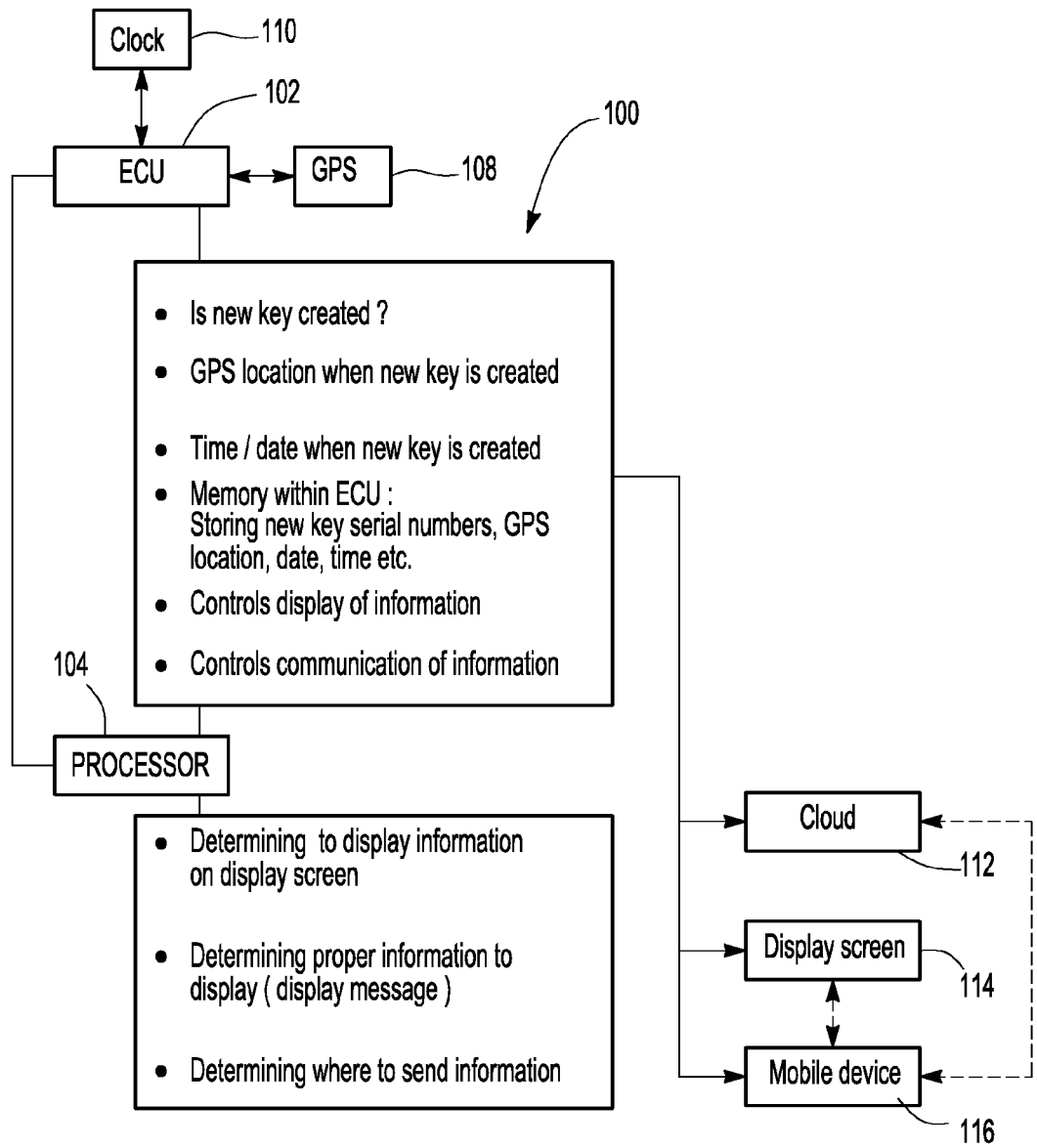
FIG. 1 illustrates a flowchart of the present notification system having a processor and an ECU.

The system 100 generally includes an ECU (Electronic Control Unit) 102 and a processor 104, such as illustrated in FIG. 1. The ECU may generally be a computer adapted to determine if a new key has been registered. The ECU 102 has the capability to determine if the new key has been created, the GPS location when the new key was created, the time and/or date of when the new key was created, and any other relevant information. The ECU 102 also is adapted to store data related to new and existing keys including serial numbers, GPS location of the key when it was created, and the date and/or time of when the key was created. To determine when a new key was created, the ECU 102 is in communication with a clock 110. In one embodiment, the clock 110 is integrated within the vehicle and in communication with the ECU 102. The ECU 102 is adapted to time stamp the creation of the new key and store it for later use when supplying a notification to the user.

A GPS (Global Positioning System) 108 is also connected to the ECU 102. The GPS is able to location stamp the creation and/or registration of a new vehicle key at the time when the vehicle key was created. The GPS 108 is adapted to determine exact location including coordinate position to easily determine where exactly the new vehicle key was created. This information may be used to track down exactly where the key was created and potentially who created the key. The GPS location information is stored in the ECU 102 for use when providing the notification to the user.

The processor 104 of the system 100 is adapted to determine if information should be communicated to the user. More particularly, the system 100 is able to determine if information should be displayed on a display screen, communicated to a third party, communicated to the user via text or email, or communicated to the user audibly through the vehicle. The processor 104 is also adapted to determine the exact message to display and/or communicate including where the key was created and when the key was created. The processor 104 may also be adapted to allow the user to report the unauthorized vehicle key creation to a third party or to automatically unregister the new vehicle key. The processor may provide a button or other selection means to the user allowing the user to determine the next step. The processor 104 is adapted to determine where to send the information including to a third party or via electronic communication via text message or email.

The processor 104 is in communication with an electronic control unit (hereinafter referred to as ECU) 106. The ECU 106 controls the display of information and also controls the communication of information to various third parties or to the cloud. The ECU is in communication with a cloud 112, a display screen 114, and/or a mobile device 116. The ECU can direct the display screen 114 to display an alert, such as the alerts illustrated in FIGS. 6 and 7. The ECU 106 may be in communication with a cloud 112. The ECU may communicate to the cloud through the user's mobile device or through an Internet connection within the vehicle. The cloud 112 may directly communicate to the mobile device 116 of the user. The cloud 112 may direct an email communication or text message communication to the user about the newly created vehicle key.

Figure 2:
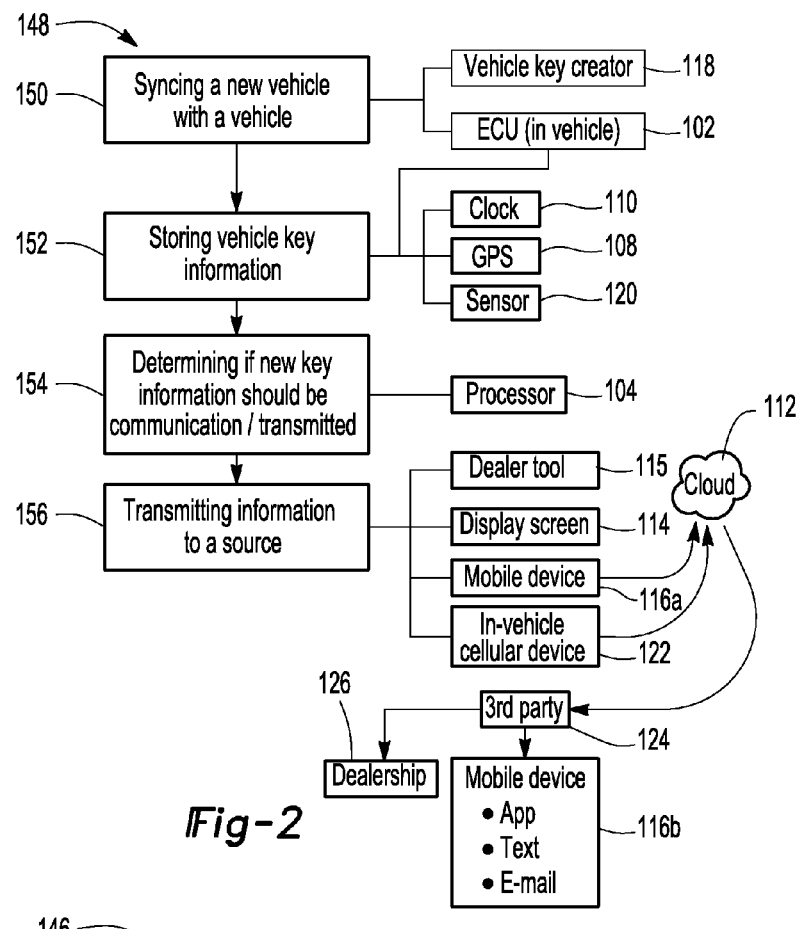
FIG. 2 illustrates a flowchart of both the method and system of the present embodiment.

The method and corresponding system components illustrated in FIG. 2. The method 148 includes first syncing 150 a new vehicle key with the vehicle. Syncing the new vehicle key with the vehicle is typically done by a dealership using a key creator 118. However, such as the reason for the present system, syncing may also be done by an unauthorized user such as a thief in a valet situation where the thief has your vehicle and an existing key. The key creator 118 requires both an existing key and the vehicle to create a new key. Syncing 150 of the vehicle key is communicated to a ECU 102 within the vehicle which may be connected to a clock 110, GPS 108, or sensor 120. Syncing involves an exchange of information between the vehicle key and the vehicle. Syncing may also involve an exchange of information between the key and the vehicle where a key creator is used an intermediate component. Syncing may be wireless, but is typically done by connecting the vehicle key to a key creator and connecting the key creator directly to the vehicle. Information is exchanged between the vehicle key and the ECU on the vehicle.

The next step of the method 148 includes storing 152 key information about when and where the new vehicle key was created. This information is stored in the ECU 102. Again, a set of information relating to time, date, and/or location is stored within the ECU by using date and location stamps from the clock 110, the GPS 108, and/or various sensors 120. The next step of the method 148 includes if the new key information should be communicated and/or transmitted to the user, as illustrated at reference numeral 154. A processor 104 is adapted to determine if the new information should be communicated and/or transmitted to the user. In most embodiments, if a new key is created, regardless of time and/or location, the information will be displayed to the user and determined there so by the processor 104. If no key has been created, no information will be displayed to the user. If the user has already selected that "I created this key" (reference numeral 181), the information will not be displayed to the user.

The next step of the method 148 includes transmitting 156 information to a source such as a display screen 114, a mobile device 116a, the cloud 112, or an in-vehicle cellular device 122. If the information is transmitted to the cloud 112, a third party 124, such as a dealership 126 or mobile device 116b, is capable. The third party 124 may transmit the notification to the mobile device by means of an app, text message, or email communication. If the dealership 126 is notified, the dealership may then contact the user directly to notify them of the registration of the new vehicle key.

Figure 3:
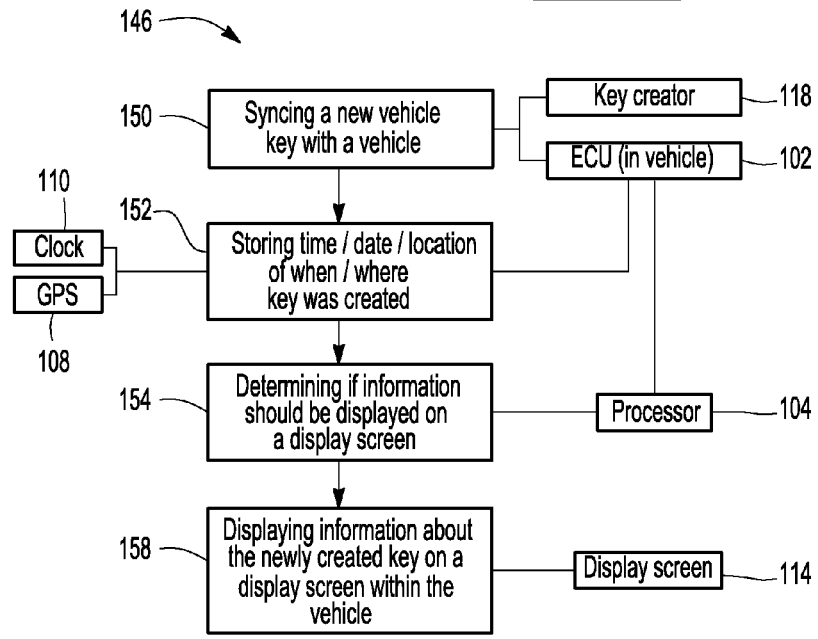
FIG. 3 illustrates an alternative embodiment of both the method and system of the present embodiment.
Figure 6:
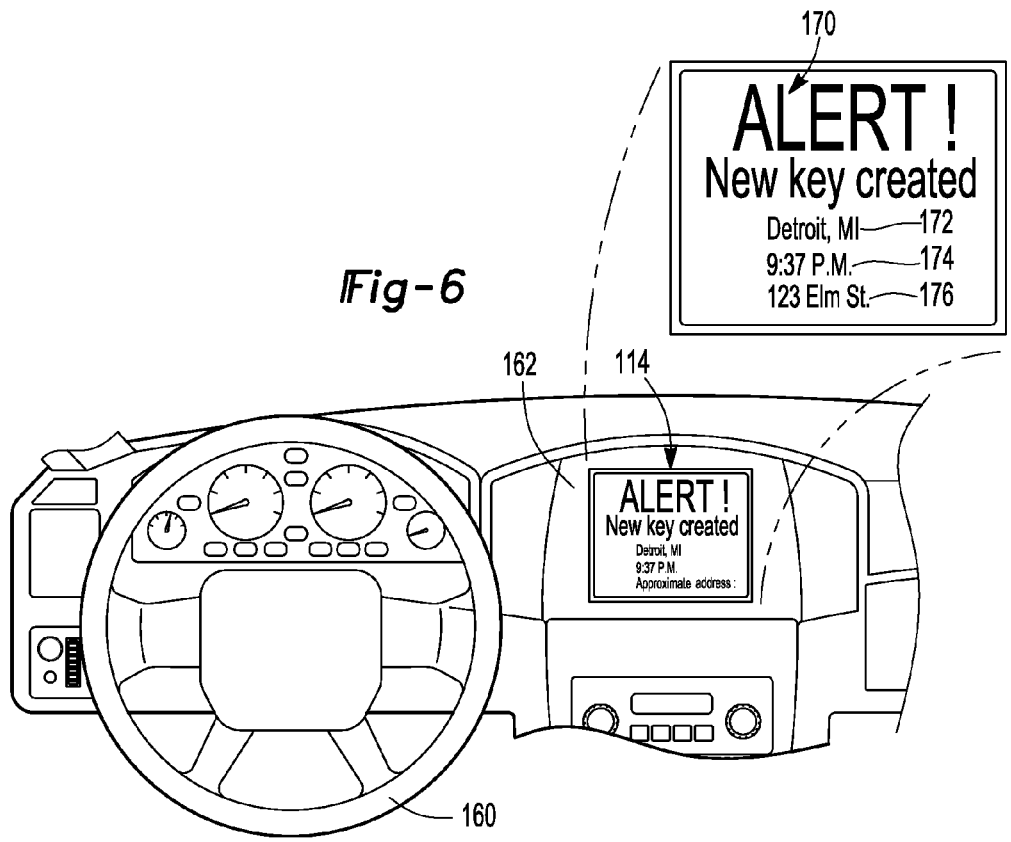
FIG. 6 illustrates an exemplary dashboard of a vehicle of the present embodiment.
Figure 7:
FIG. 7 illustrates an exemplary notification provided to the user.

The creation and registration of a new vehicle key may be displayed directly on a display screen within the vehicle, such as illustrated in the method and system shown in FIG. 3. The method 146 of FIG. 3 includes the steps of syncing 150 a new vehicle key with a vehicle. Syncing the new vehicle key may include using a key creator 118 in connection with an existing vehicle key and the vehicle. The ECU 102 within the vehicle is adapted to store the time, date, and location of when and where the vehicle key was created. This is illustrated by reference numeral 152. As in previous embodiments, the clock 110 and/or GPS 108 may be utilized to include a time stamp of when and where the vehicle key was created. The next step includes determining 154 if information should be displayed on a display screen. As in previous embodiments, this is determined by means of a processor 104. The next step includes displaying 158 information of the newly created key on a display screen 114 within the vehicle. Information may include a warning or alert integrating where and when the new key was created. Exemplary embodiments of the alert are illustrated in FIGS. 6 and 7.

An illustration of the system for notification to a driver that a new vehicle key has been created is illustrated in FIG. 4. The system is centralized around a vehicle 128 having a GPS 108. The vehicle 128 is connected, typically by Bluetooth, to a mobile device 116. In alternative embodiments, the vehicle 128 includes an Internet connection or in-vehicle cellular device 122. The vehicle 128 includes a database of information 129 for providing notifications to the user.

By way of example, FIG. 5 illustrates an example database of key information stored within the ECU 102 of the present system. The database includes the key number/serial number, registration date and time, and registration location. By way of example, key number 1 was created on Jan. 1, 2015 at 8:48 a.m. in Ann Arbor, Mich., having GPS coordinates 42.2814 degrees north, 83.7485 degrees west. Keys numbers 2 and 3 were created at the same time and location as compared to key number 1. These keys were clearly created when the vehicle keys were registered. These keys are designated by reference numeral 180. Key number 4, as illustrated by reference numeral 182, is a replacement key created on Feb. 25, 2015 at 2:05 μm. in Ann Arbor, Mich. The GPS coordinates are the same indicating that the key was created at the same dealership as keys 1-3. Unauthorized key 184, also shown as key number 5, was created on Jul. 10, 2015 at 9:37 μm. in Detroit, Mich. The next time the user starts the vehicle after data from key 184 is inputted into the ECU, a notification will be displayed on a display screen within the vehicle to the user notifying the user that a new key has been created in Detroit, Mich., at 9:37 μm. Other information such as the address or specific coordinates may also be displayed on the display screen. By way of example, FIGS. 6 and 7 illustrate a display 170 having an alert indicating the location 172, the time 174, and the street address 176 where the new key was created. The location 172, the time 174, and the address 176 are provided to the user to help the user potentially track down where the new key was created. This information may also be supplied to the authorities in an effort to track down the creator of the unauthorized key.

The display 170 is displayed on a display screen 114 on a dashboard 162. The dashboard is within the vehicle 128 having a steering wheel 160. The arrangement as illustrated in FIG. 6 is exemplary and is not intended to limit the scope.

In an alternative embodiment as shown in FIG. 7, the alert and notification display 170 includes buttons 181, 182 allowing the user to input whether or not they created the key. If the user selects button 181, a notification will be sent to the ECU to not repeat the notification since the user has authorized that they created the key. Button 182 allows the user to report that an unauthorized key has been created. If the user selects button 182, information may be sent to a dealership, the authorities, or other third party to report that a theft has occurred.

In other embodiments, the information relating to where and when the new key was created, but not displayed on the display screen within the vehicle. In this embodiment, the user is notified that the new key has been created, but the specifics (time, date, location) are not displayed. The user then takes the vehicle to a dealer allowing the dealer to connect to the vehicle with a dealer tool 115 (i.e. Techstream). The dealer connects the dealer tool 115 to the vehicle by means of the vehicle CAN bus (via the OBDII connector) to display the time, date and location on a display screen 117 of the dealer tool 115.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the appended claims.

I claim:

1. A notification system for registration of a new key of a vehicle, the system comprising:
    an electronic control unit (ECU) adapted to receive and store information regarding the registration of a new key;
    a processor in communication with the ECU, the processor adapted to determine if a notification should be provided to the user regarding the registration of the new key;
    the ECU adapted to control where the notification is displayed; and
    a display screen in communication with the ECU, the display screen displaying a notification to a user that the new key has been registered.

2. The notification system of claim 1 wherein a GPS unit is contained within the vehicle, the GPS in communication with the processor to determine a location of the vehicle when the new key was registered.

3. The notification system of claim 2 wherein the location of the vehicle when the key was registered is displayed on the display screen.

4. The notification system of claim 2 wherein the location of the vehicle when the new key was created is communicated to a third party.

5. The notification system of claim 1 wherein a clock is contained within the vehicle, the clock in communication with the processor to determine what time the new key was created.

6. The notification system of claim 5 wherein the time that the new key was created is displayed on the display screen within the vehicle.

7. The notification system of claim 5 wherein the time that the new key was created is communicated to a third party.

8. A notification system for registration of a new key, the system comprising:
    an electronic control unit (ECU) adapted to receive and store information regarding the registration of a new key;
    a processor in communication with the ECU, the processor adapted to determine if a notification should be provided to a user regarding the registration of a new key;
    the ECU adapted to control where the notification is displayed; and
    the ECU automatically sending an electronic communication to the user of the vehicle through email and/or text messaging, the electronic communication including a notification to the user that the new key has been registered.

9. The notification system of claim 8 wherein a GPS unit is contained within the vehicle, the GPS in communication with the processor to determine a location of the vehicle when the new key was registered.

10. The notification system of claim 9 wherein the location of the vehicle when the key was registered is sent to the user via the electronic communication.

11. The notification system of claim 8 wherein the location of the vehicle when the new key was created is communicated to a third party.

12. The notification system of claim 8 wherein a clock is contained within the vehicle, the clock in communication with the processor to determine a time the new key was created.

13. The notification system of claim 12 wherein the time that the new key was created is sent to the user via the electronic communication.

14. The notification system of claim 12 wherein the time that the new key was created is communicated to a third party.

15. A method of providing a notification to the user of a vehicle, the method comprising the steps of:
   creating a new vehicle key in connection with an existing vehicle, creating of the new vehicle key by means of a key creator;
   storing a time, date and/or a location of when and/or where the vehicle key was created in an electronic control unit (ECU);
   displaying the time, date and/or location of when and/or where the vehicle key was created on a display screen; and
   determining by a processor if the time, date and/or location of when and/or where the vehicle key was created should be displayed.

16. The method of claim 15 further comprising the step of transmitting the time, date and/or location of when and/or where the vehicle key was created to a third party.

17. The method of claim 15 further comprising the step of electronically notifying the use via email and/or text message of the time, date and/or location of when and/or where the vehicle key was created.

18. The method of claim 15 further comprising the step of displaying the time, date and/or location of when and/or where the vehicle key was created on a display screen within the vehicle automatically upon starting of the vehicle.

19. The method of claim 15 further comprising the step of providing an audible alert to the user when the new vehicle key has been created.

* * * * *

UNITED STATES PATENT AND TRADEMARK OFFICE
CERTIFICATE OF CORRECTION

PATENT NO. : 9,530,260 B1  
APPLICATION NO. : 14/742046  
DATED : December 27, 2016  
INVENTOR(S) : Nicholas Scott Sitarski Page 1 of 1

It is certified that error appears in the above-identified patent and that said Letters Patent is hereby corrected as shown below:

On the Title Page

Item (51), Int. Cl. delete "G05D 19/00" and insert --G05B 19/00--, therefor.

In the Specification

In Column 5, Line 21, after "at 2:05" delete "μm" and insert --p.m.--, therefor.

In Column 5, Line 25, after "at 9:37" delete "μm" and insert --p.m.--, therefor.

In Column 5, Line 29, after "at 9:37" delete "μm" and insert --p.m.--, therefor.

Signed and Sealed this  
Twenty-eighth Day of February, 2017

Michelle K. Lee  
*Director of the United States Patent and Trademark Office*